S. E. WINDER.
CHARGING AND DELIVERING MECHANISM FOR CONE BAKING MACHINES.
APPLICATION FILED OCT. 27, 1914.
1,170,720.
Patented Feb. 8, 1916.
4 SHEETS—SHEET 1.
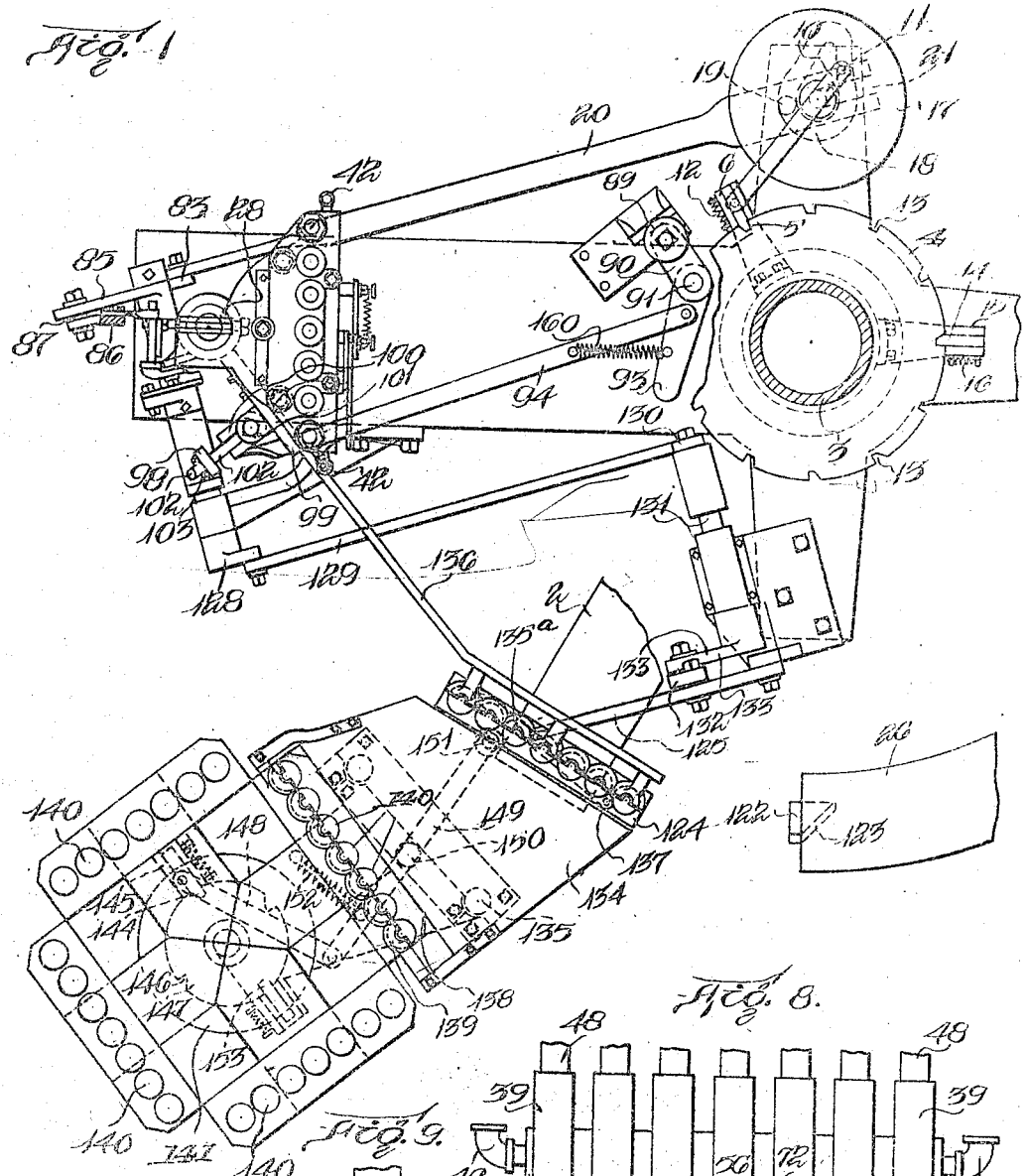
Fig. 1
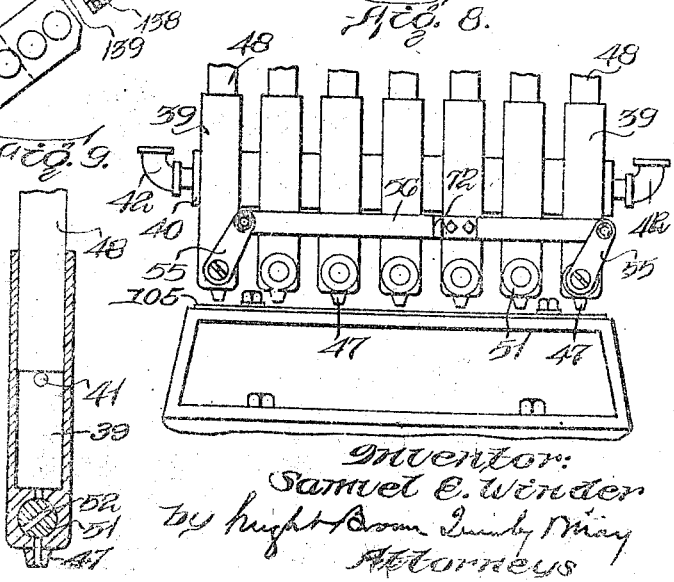
Fig. 8
Fig. 9
Witnesses:
Inventor:
Samuel E. Winder
Attorneys

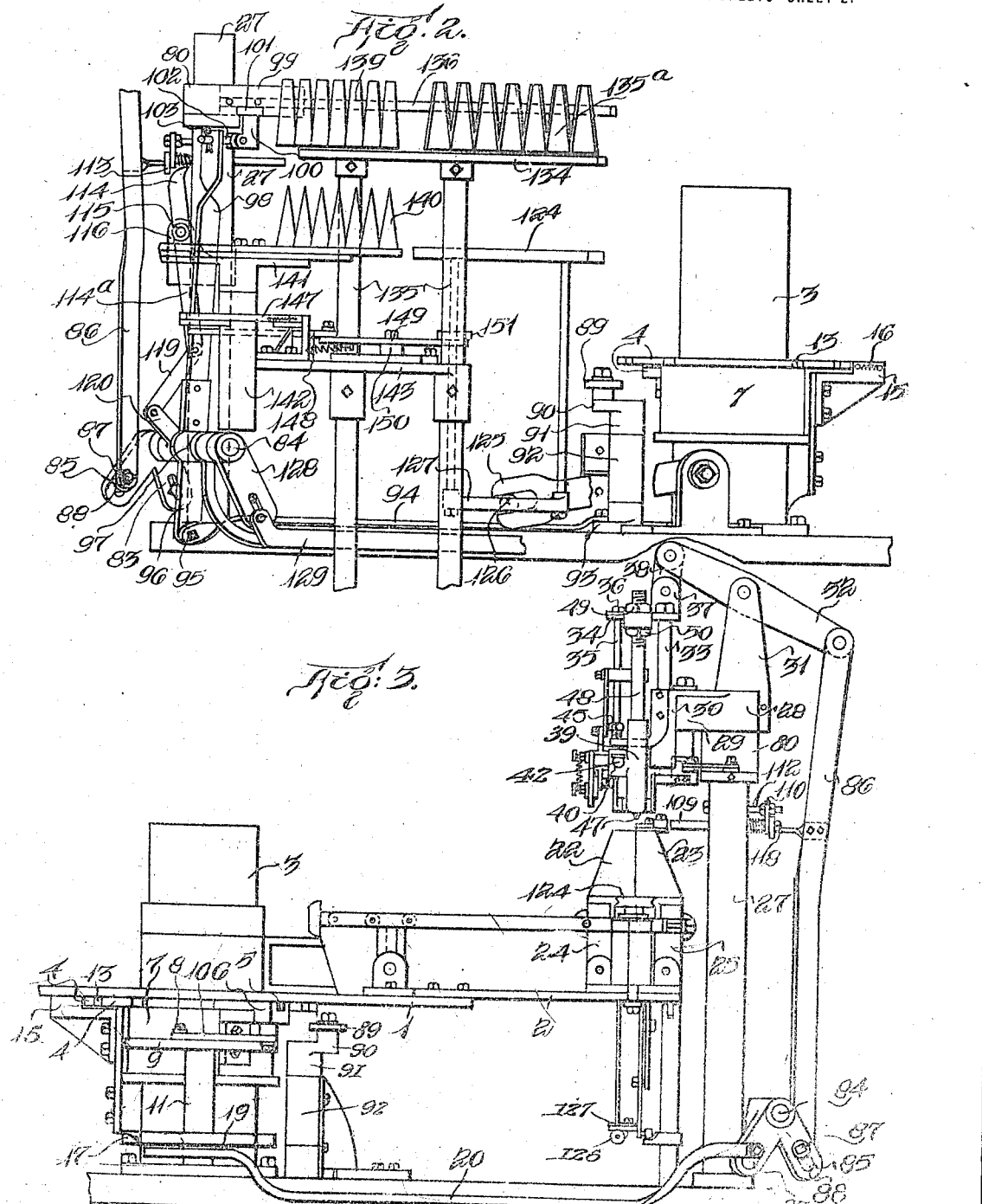

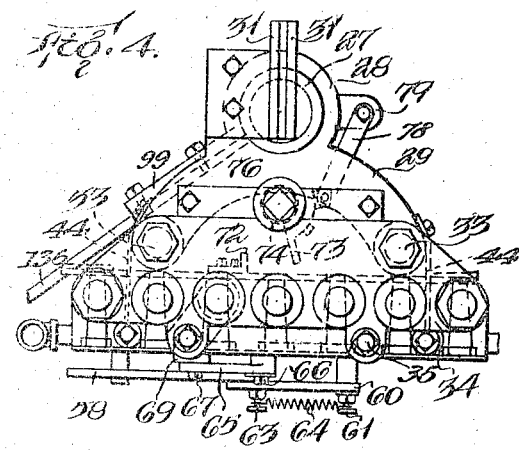

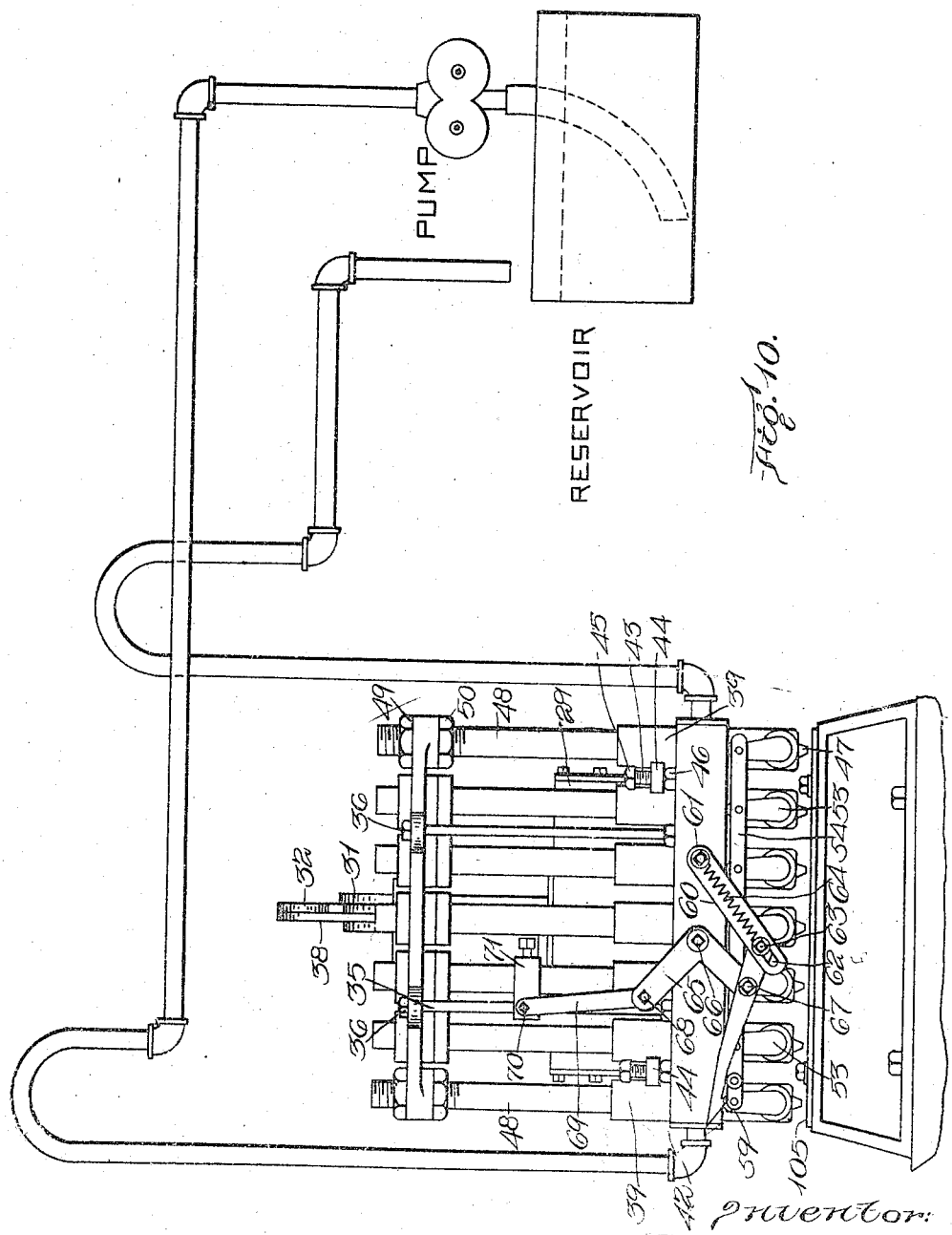

UNITED STATES PATENT OFFICE.

SAMUEL E. WINDER, OF CHICAGO, ILLINOIS, ASSIGNOR TO APPLETON P. WILLIAMS, OF WEST UPTON, MASSACHUSETTS.

CHARGING AND DELIVERING MECHANISM FOR CONE-BAKING MACHINES.

1,170,720.      Specification of Letters Patent.      Patented Feb. 8, 1916.

Application filed October 27, 1914. Serial No. 868,849.

*To all whom it may concern:*

Be it known that I, SAMUEL E. WINDER, a citizen of the United States, and resident of Chicago, in the county of Cook and State of Illinois, have invented certain new and useful Improvements in Charging and Delivering Mechanism for Cone-Baking Machines, of which the following is a specification.

The present invention relates to machines for molding articles from plastic material and baking such articles, the class of articles for which the herein illustrated embodiment of the invention is particularly intended being pastry cones, known commonly as ice cream cones, and the particular type of machine to which this invention is applied being generally that shown in my pending application filed January 2, 1914, Serial Number 810,063 for machine for baking pastry cones.

The features to which the present invention particularly relate are a filling or charging mechanism for the mold or molds of the machine, and an improved means for removing the baked, or otherwise finished articles, from a mold or molds.

I desire to state that in characterizing the invention as above, I have not intended to limit the particular invention hereinafter described and claimed to a machine of the specific nature disclosed in my prior application aforesaid, but I consider that the invention is applicable to machines and apparatus for producing other sorts of articles, and intend the following claims to embrace all charging and delivering mechanisms having the characteristics recited in the claims, whatever may be the purposes to which they may be devoted. In the following description of the hereinafter illustrated embodiment of my invention, I shall refer to my prior application No. 810,063 for the purpose of illustration and to assist in giving a clear understanding of the mode of operation of this particular embodiment, but without any intention of limiting the invention otherwise than the same is limited by the express terms of the appended claims.

The objects of the present invention appear from the following description of the construction and operation of the herein illustrated embodiment of the same.

In the accompanying drawings, Figure 1 is a plan view of so much of a machine such as that shown in my prior application above referred to, with the new features of the present invention applied thereto, as is necessary to illustrate this invention. Fig. 2 is an elevation of that part of the machine shown in Fig. 1, with the charging or filling apparatus removed. Fig. 3 is an elevation representing that part of the machine shown in Fig. 1 as viewed from the opposite side of Fig. 1 from the view shown in Fig. 2. Fig. 4 is a plan view of the charging or filling mechanism. Fig. 5 is an elevation of that side of the charging mechanism which is turned toward the center of the machine. Fig. 6 is an elevation and partial section of the mechanism shown in Fig. 5 as seen from the right of said figure. Fig. 7 is a plan view of one of the molding units in the charging position, said figure showing also the means, partly in section and partly in plan view, for closing the cover to the mold inlets. Fig. 8 is an elevation of the charging units, or pumps of the charging device, the same being viewed from the opposite side to that shown in Fig. 5. Fig. 9 is a sectional view of one of the charging units or pumps. Fig. 10 is a diagrammatic view illustrating the means for supplying the charging device from a distant reservoir.

Like reference characters indicate the same parts in all the figures.

It is to be understood that the baking machine to which the appliances embodying my present invention are applied consists of a turntable 1 (Fig. 3) having outwardly projecting arms 2, each of which carries a mold, or molding unit. The turntable rotates about a column 3, being driven by a pawl and ratchet mechanism in substantially the manner explained in my prior application referred to. The ratchet is designated 4 in the present drawings, and is rigidly secured to the turntable. The pawl is designated 5 and is in the form of a sliding bolt carried by an arm 6, which projects from a sleeve 7 rotatable about the column 3 and is driven by a crank pin 8 on a disk 9 through a connecting rod 10. The crank disk 9 is on a shaft 11, which may be driven by means such as shown in my application before referred to, or by any other desired means. The pawl 5 is pressed toward the rim of the ratchet disk by a spring 12, as shown in Fig. 1 so that it may enter notches 13 in such rim, the pawl and notches being beveled on one side and being square on the other so that the mechanism is positive in one direction and the pawl is adapted to withdraw from the notches on the reverse strokes. A holding pawl 14 is mounted on a fixed holder 15 and pressed toward the disk by a spring 16 to prevent reverse movement of the turntable. A cam 17 is mounted on the shaft 11 and is provided with a cam groove 18, which acts on a stud 19 on a connecting rod 20 to reciprocate the latter for purposes hereinafter described. Rod 20 is forked at one end as shown at 21 to embrace the shaft 11, whereby said rod is guided.

The molding devices or molding units are substantially the same as illustrated in my prior application and consist of two half molds 22 and 23 mounted on pivoted carriers 24 and 25, respectively, and each containing a number of molding cavities, and cores centrally located within such cavities to form the hollow interior of the baked cones. These molds are carried by the rotation of the turntable through an oven, of which the outlet end is shown in a fragmentary way in Fig. 1 and is designated 26, and the molds are opened and closed at stated times by means such as shown in my prior application, or by any other suitable means. The intermittent movement given to the turntable by the pawl and ratchet drive causes the turntable to stop just after each mold emerges from the oven and also just before each mold enters the oven, and while the mold is in position to be filled. The filling or charging device forms a feature of the present invention and will now be described. Such device is mounted upon a fixed post 27 which rises from a suitable base outside of the sweep of the mold carrying arms. To the upper end of such post there is fixed a bracket 28 having divergent horizontal arms 29 and guides 30 on the ends of said arms. The bracket 28 also has upstanding lugs 31 between which is pivoted a rocker 32. The guides 30 receive guide rods 33 of a structure which may be called for the purposes of this invention a "pump carrier," and which consists of the said rods 33, and a yoke or cross piece 34 lifter rods 35 pass through the yoke 34 and have heads 36 overlying said yoke, and are secured to the batter chest 40, later described. The yoke is provided with lugs 37 to which is pivoted one end of a connecting link 38, the other end of said link being pivoted to the rocker 32. Oscillation of the rocker, by means presently to be described, causes the pump carrier to move up and down, the rods 33 then sliding in the guides 30.

The charging device, or pump, is mounted upon the pump carrier and consists of one or more pump units, equal in number to the mold cavities in the molding unit. In the present instance there are seven mold cavities in each molding unit, and a like number of pump units. The barrels of these pump units are designated 39 and are all connected with a chest 40, which contains the batter, or other plastic material, used by the machine. Each pump barrel has a port 41 communicating with the chest 40, as shown in Fig. 6, and the latter is provided with inlet couplings 42 at one or both ends for connection with a reservoir or other larger supply of batter, whereby it may be constantly replenished. Preferably the reservoir is set far enough away from the baking machine to avoid liability of the batter being heated and dried by the heat from the machine, thus avoiding one source of waste. A pump or any other suitable means maintains a circulation of the batter from the main supply tank through the chest or chamber 40 and back to the tank, supplying as much batter as is needed to make the full charge of each of the pumps, but without supplying too much batter. The pump barrels and chest, which are preferably made in one piece, may be called the casing structure of the pump. This casing structure is secured to the rods 35 at the lower ends of the latter, and thereby suspended from the pump carrier. This casing structure also carries one or more adjustable stop screws 43 passing freely through eyes in lugs 44, which are fixed to the arms of bracket 29. The screws 43 have heads 45 and lock nuts 46 on respectively opposite sides of the lugs 44, which act as abutments to limit the possible reciprocating movement of the pump casing structure, and one of these abutments is adjustable. The lower ends of the pump barrels are provided with outlet nozzles 47 which register with the openings to the corresponding cavities of the molding unit which is in charging position. The pump plungers are shown at 48 and are secured to the yoke 34 of the pump carrier, passing through such yoke and having adjustable securing nuts 49 and 50 above and below the yoke, respectively. The plungers reciprocate with, and also relatively to, the pump barrels, to an exact amount regulated by the adjustment of the nuts 49 and 50 and of the abutments 44 and 46. In the upper limit of their travel relatively to the barrels, the plungers uncover the ports 41, as indicated in Fig. 6.

Each pump contains a valve in the outlet passage leading from its bore, such valve being conveniently a plug cock 51 having a passage 52 adapted to be turned into and out of registry with the outlet passage of the pump, as shown in Fig. 9. Each of these cocks has an arm 53, and all of such arms are connected by a bar 54. In addition the cock of each of the two endmost pump units has an arm 55 at the end opposite to that on which the arm 53 is mounted, and these arms 55 are connected together by a bar 56. The connecting bar 54 carries a stud 57 over which extends a latch or pawl 58 having a shoulder 59. This latch is supported by a link 60 which is pivoted to a stud 61 on the pump casing structure and has in its swinging portion a slot 62 receiving both pivotally and slidingly a stud 63 which forms the connection between this link and the latch. A spring 64 is connected to the studs 61 and 63 and tends to hold stud 63 at the inner limit of the slot 62. A bell crank lever 65 is also pivoted on the pump casing structure on a pivot stud 66. One arm of this bell crank, which is shorter than the link 60, is connected by a pivot 67 with the latch 58 and the other arm is connected by a pivot 68 with a link 69, the latter being pivoted on a stud 70 projecting from an arm 71 fixed on one of the pump plungers 48. The bar 56 which connects the arms on the other ends of the pump cocks carries a shoulder or abutment 72 in the path of an arm or finger 73, which projects from a rocking element 74. This element 74 is a sleeve pivotally supported on a stud 75, which is suspended from the bracket 28, being connected to a cross piece 76, which passes between the arms of said bracket, as shown in Fig. 4. The rocking sleeve has an arm 77 connected by a link or connecting rod 78 with an arm 79 on a sleeve 80 which is oscillatively mounted on the post 27 and is confined between the bracket 28 and a collar 81, which is clamped to the post by a set screw 82.

I will now describe the mechanism which operates the pump and the cocks to cause the batter to be injected into the mold at the proper times.

The connecting rod or link 20 previously described is joined to an arm 83 on a rock shaft 84, which is properly supported in bearings at the foot of the column 27. This rock shaft carries a second arm 85 with which the lower end of a link or connecting rod 86 is attached by means of a pivot stud 87, which is adjustable in a slot 88 of the arm 85. The upper end of link 86 is connected to the rocker 32; hence when the rock shaft 84 is oscillated the rocker is likewise oscillated and the pump is moved up and down. The first operation in charging is a downward movement of the pump, caused by the offset part of the cam 18 moving the connecting rod 20, which movement is transmitted through the connecting rod 86, and rocker 32 to the pump carrier. In the first part of this movement the plungers 48 force the casing structure downward until the stops 45 strike the fixed abutment lugs 44, when the casing structure is arrested. The carrier yoke 34 continues in motion, sliding along the lifter rods 35, and the guide rods 33 sliding through the guides 30, and advances the pump plungers 48 in the now stationary pump barrels 39, thus ejecting the batter. While the plungers move thus relatively to the pump barrels, the bell crank 65 is oscillated by the connections thereto from one of the plungers, and the latch 58 is moved bodily, causing its shoulder 59 to strike the stud 57 and move the bar 54, thereby shifting the pump cocks from the closed position shown in Fig. 9 to the open position. When the cock has arrived in this position the latch is automatically disengaged from the stud 57 by the action of the link 60, which swings the latch so that its abutment 59 rises out of contact with stud 57. This action occurs by reason of the fact that the link 60 is moved about its pivot by the translative movement of the latch, and being longer than the arm of the bell crank which moves the latch, it lowers the connecting pivot 63 of the latch more than the fulcrum pivot 67 is lowered, thereby swinging the latch about its connection 67 with the bell crank in the direction which causes its disengagement from the stud 57. Thereby the cocks cease to turn when they arrive in the open position, and the plungers are enabled to expel the batter during the remainder of their downward movement. The cocks are subsequently closed by the finger 73, which strikes the abutment 72 on the connecting bar 56, and moves it in the direction opposite to the movement just described. The finger 73 is actuated to this effect after the plungers have ejected the batter and before the turntable has shifted the molding unit from the filling position, by means of the driving pawl carrier 6 which, in its return stroke after advancing the turntable, strikes a roll 89 on an arm 90, which projects from an upright rock shaft 91 mounted in a bearing 92 near the central column of the machine. This rock shaft carries a second arm 93 connected to a link 94, which is also connected by the pivot pin 95 with a lever 96 which has a hub 97 supported and rotatable freely on the rock shaft 84. An arm 98 rises from the lever 96 and is jointed to an arm 99 which extends from the sleeve 80 previously described as carrying the arm 79. The connection between the arms 98 and 99 consists of a block 100 which is pivoted to a lug 101 on the arm 99 and to which is pivoted an eyebolt 102, which passes through the arm 98 and is secured by a cotter pin 103. The pivots connecting the block 100 with the lug 101 and the eyebolt 102 are at right angles to each other, whereby the arms 98 and 99 are capable of swinging, without binding, in different planes. It is understood that the oscillation of the sleeve 80, imparted through the mechanism last described, moves the finger 73 through the arm 79, link 78, arm 77, and rock sleeve 74 to give the desired closing movement to the pump cocks.

After the mold has been charged, the inlets 104 thereof are closed by a cover 105, shown best in Fig. 7, which is mounted on one of the parts of the molding unit on studs 106 and is permitted to move between the limits imposed by the slots 107 which receive said studs, such limits being wide enough to permit the cover to be withdrawn to one side of the mold inlets, and to be pushed across such inlets. The cover carries a stud or roll 108 which is in line with a pusher 109 when the mold is in charging position, said pusher passing and being movable endwise through the column 27 and carrying an abutment 110 against which presses a spring 111 coiled about the pusher and reacting against the column. The abutment 110 is secured to a guide rod 112 which also passes and moves endwise through the column. A dog 113 is pivoted on the pusher 109, or on the abutment plate 110, in the path of an actuator lever 114, which lever is pivoted by a stud 115 on a bracket 116 secured to the column 27. Dog 113 has a tail piece 117 which extends under a finger 118 projecting from the connecting rod 86 which actuates the rocker of the pump carrier. Actuator lever 114 has an arm 114$^a$ extending below its pivot and connected by a link 119 with an arm 120 which is fixed on the rock shaft 84. In the movement of the rock shaft which causes descent of the pump, the actuator 114 is moved outwardly and under the dog 113, raising such dog by contact of its outer cam-like surface with the dog. When the actuator has passed under the dog the latter falls back by its own weight in the path of the actuator. On the reverse stroke of the pump, the actuator 114 is moved inwardly and pushes against the dog 113, thereby forcing the pusher against the stud 108 of the cover 105 and closing the latter. This action occurs as soon as the pump begins to rise after the charge has been injected into the mold. As the pump continues to rise and the operating link 86 to descend, the finger 118 on said link bears on the tail 117 of the dog and lifts the dog above the tip of actuator 114, whereby the pusher is released from the actuator and allowed to move outwardly under the pressure of spring 111. This spring retains the pusher in a position just clear of the studs 108 of the molding units when the covers of such units are displaced as shown in Figs. 6 and 7, this position being determined by the head 121 on the rod 112 which bears on the post 27 and limits the outward movement of the pusher. The actuator 114 meanwhile remains in the inner position inoperatively, and is drawn back again into position to make a working stroke when the pump is again operated as above described. The cover on each mold is withdrawn into the position shown in Figs. 6 and 7 upon emerging from the oven, by means of a cam 122 secured to the inner side of the oven top wall and having a surface 123 which engages the stud 108 of each molding unit cover as the same passes out of the oven.

I will now describe the new and improved means for receiving the finished product from the molding and baking machine.

Each mold as it emerges from the oven stops in the discharging position occupied by the arm 2 shown in Fig. 1. When in this position the ejector plate 124, which forms the bottom of the mold and may be constructed and arranged in the same manner as the ejector plate in my prior application referred to, is raised by a forked arm 125 which receives a roll 126, on a frame 127 which hangs from the ejector plate. The arm 125 is raised and lowered by the shaft 84 through an arm 128 on said shaft, a connecting rod 129 extending from said arm, and an arm 130 on the rock shaft 131 which oscilates the actuator arm 125 through a link 132 and an arm 133, all substantially as described in my prior application. In Fig. 2 I have shown the ejector and elevating frame therefor and the actuating arm 125 in skeleton, having left out the other parts of the molding unit and the turntable arm by which the same are carried. It is to be understood, however, that in the actual machine the member 124 is arranged substantially as is the corresponding ejector in the machine shown in my prior application. The upward movement of the actuator arm 125 raises the ejector to the level of a stationary receiving table 134, which is supported upon posts 135 rising from the base of the machine, in a position close to one edge of the table and in a vertical plane extending between such edge and a cone transferrer 135$^a$. This transferrer has a number of pockets corresponding in shape and spacing to the shape and spacing of the finished cones or other articles, and is carried by a rod 136 which is secured to the arm 99 previously described as projecting from the sleeve 80 mounted on the post 27. In normal position the transferrer 135$^a$ is far enough removed from the edge of the receiving table 134 (see Fig. 1) to permit the baked cones carried by the ejector to pass between such edge and the transferrer. When the arm 99 is moved as previously described, the transferrer sweeps across the ejector and the receiving table, and carries the cones before it, each of the pockets in the transferrer receiving and positioning one of the cones. Adjacent to and somewhat removed from the opposite edge 138 of the stationary table is a guide 139 corresponding in form and complemental to the transferrer 135$^a$, and having recesses adapted to receive the cones and spaced correspondingly thereto. The transferrer sweeps the cones across the table and up against the guide 139 over the space between such guide and the edge 138 of the receiving table, and the cones drop through this space upon plugs 140 which rise from a rotatable depository. The depository here shown is a table 141 having a shank which is mounted rotatably in a bearing 142 carried by a bracket 143 which is secured to the posts 135 of the receiving table. This depository has four arms, each of which carries a set of plugs alined and spaced correspondingly to the pockets in the transferrer 135ᵃ and guide 139; and it is intermittently rotated and stopped after each step of its rotation with one set of plugs directly under the cavities in the guide 139. Thus the cones, or other baked articles, after having been swept across the receiving table by the transferrer and properly located by the coaction of the transferrer with the guide, fall upon the plugs 140 and are received and positioned by them. The intermittent rotary movement mentioned is given to the cone depository by a pawl 144 upon an oscillating pawl carrier 145 co-acting with notches 146 in a rotating disk 147 secured to the shank of the depository. The pawl carrier is connected by a link 148 with a lever 149 pivoted at 150 to the bracket 143, and it carries an anti-friction roll 151 on its end near the receiving edge of the table 134 in position to be struck and displaced when the mold-carrying arm 2 is moved from the discharging position. The movement given to the lever 149 by the arm 2 displaces such lever in the direction required to give the pawl 144 its operative stroke, and it continues far enough to move the pawl through the angular distance between two of the notches 146. A spring 152 returns the pawl carrier and lever 149 to their normal position after the arm has passed by the roll 151. A retaining pawl 153 holds the depository when the pawl moves back after its operative strokes.

It is to be understood that the receiving means for the baked cones is located adjacent to the stopping point of the molds immediately after emerging from the oven, and that the charging pump mechanism is located adjacent to another stopping position of the molds. These two positions may be proximately adjacent ones or not as desired.

The driving mechanisms for the operations hereinbefore described are so arranged that these operations take place in sequence and without interfering with one another or with the movements of the mold-carrying turntable. The charging and return strokes of the pumps occur shortly after the turntable has come to rest after each step of its intermittent movement. At the same time the actuator for the cone ejector raises the ejector with the baked cones from the mold which is in discharging position, up to the level of the receiving table; and while the cone ejector is raised, the pawl carrier 6, which in the meantime has commenced and proceeded on its backward stroke from one of the notches 13 toward the next one, engages the roll 89 on arm 90 and swings said arm so as to swing the arm 136 with the transferrer 135ᵃ, in the manner already described, across the ejector and the depository. During this swinging movement of the transferrer, the finger 73 is caused to close the cocks of the pump elements. Thereafter the pump plungers and pumps rise and a fresh charge of batter is drawn into the pumps, and the pawl carrier is given its next forward stroke to turn the turntable a further step, then permitting the arm 90 to return to normal position, to which it is returned by the spring 160 shown in Fig. 1, and thereby the transferrer 135ᵃ and the cock operating finger 73 are returned to their normal positions. The formation of the cam 18 and its position with respect to the crank pin 11 are so designed as to cause the steps described to take place in the proper sequence.

I desire to say in reference to the terms used in the foregoing description, that such terms are used descriptively in connection with the particular illustrated embodiment of the invention, and without limiting significance. These terms have been chosen in the effort to explain the particular form of the invention here shown in a clear and graphic manner. I wish it understood that I intend to include within the scope of these terms any mechanisms and parts which have the same essential characteristics of construction and operation as the mechanisms and parts here shown, even though the most restricted definitions of terms here used should not include the same. Also it is to be understood that I do not limit the invention to any particular number of elements in the pump or of mold cavities in the molding unit, but include within the scope of the invention a charging device having only one pump unit as well as a machine having only a single mold.

What I claim and desire to secure by Letters Patent is:

1. A charging apparatus comprising a carrier, a plunger fixed to said carrier, an operating actuator connected to the said carrier and operable to move the same and the plunger back and forth, a pump casing having a chamber into which said plunger extends, and having an outlet directed in the same direction as the movement of the carrier, connecting means between said casing and carrier having a lost motion by which the casing is moved positively by the carrier in one direction and the plunger is thereafter enabled to move relatively to the casing, and a fixed abutment for limiting the movement of the pump casing in the opposite direction at a point short of the limit to which the carrier and plunger are moved by said actuating means.

2. A charging device comprising a pump casing, a plunger working in said casing, a carrier to which said plunger is attached, actuating means connected to said carrier for applying force thereto and thereby moving the plunger and the pump casing, a fixed stop for arresting the pump casing during the movement of the plunger in one direction, and lost motion connecting means between the carrier and casing for moving the casing in the opposite direction.

3. A charging device comprising in combination, a guide, a guideway for constraining said guide to move in a definite path, a pump plunger rigidly connected to said guide, a pump casing into which said plunger extends, said casing being movable with the plunger, actuating mechanism connected with the plunger for applying force thereto, whereby said plunger is moved back and forth, a fixed stop, and abutments carried by the pump casing for confining the movement thereof within limits less than the limits of movement of the plunger, whereby the plunger in its movement in one direction is caused first to advance the pump casing, and is then moved relatively to the casing to discharge material therefrom.

4. The combination with a mold having an inlet, of an apparatus for charging such mold, comprising a pump casing having an outlet in line with the inlet to the mold and being movable toward and away from the latter, a plunger operating in said pump casing in the line of movement thereof, means for applying force to said plunger to reciprocate the same, the pump casing being movable with the plunger toward the mold inlet, and means for arresting the pump casing when its outlet is substantially in registry with such inlet, the plunger being adapted to continue in motion after the arrest of the casing, whereby to expel material from the casing into the mold.

5. The combination with a mold having an inlet, of a charging device comprising a chamber having an outlet movably mounted to bring such outlet into substantial registry with the mold inlet, and away from the same, a plunger operating in said chamber in the line of movement thereof, actuating means for applying force to said plunger to reciprocate the same, said chamber being adapted to move with said plunger, and a stop for arresting the chamber when the outlet thereof is contiguous to the mold inlet, the plunger being adapted to continue in motion whereby to discharge the contents of the chamber into the mold.

6. The combination with a mold having an inlet, of a charging device comprising a chamber having an outlet movably mounted to bring such outlet into substantial registry with the mold inlet, and away from the same, a plunger operating in said chamber in the line of movement thereof, actuating means for applying force to said plunger to reciprocate the same, said chamber being adapted to move with said plunger, said chamber having an inlet arranged in its side across which the plunger passes, and means for arresting the chamber when the outlet thereof is contiguous to the mold inlet and before the plunger has reached the end of its travel, said means being arranged also to arrest the chamber in its movement away from the mold before the plunger has reached its limit of travel, whereby to cause the plunger to uncover said inlet and permit admission of batter to the chamber.

7. A charging device comprising a pump casing having a lateral inlet and an outlet, a plunger movable in said casing across said inlet toward and away from said outlet, a valve controlling said outlet, and means operated by the plunger during the first part of its movement toward the outlet and after crossing the inlet, for opening said valve.

8. A charging device comprising a pump casing having a lateral inlet and an outlet, a plunger movable in said casing across said inlet toward and away from said outlet, a valve controlling said outlet, means for opening said valve after the plunger has commenced its movement toward the outlet, and means for causing said valve to close the outlet while the plunger withdraws therefrom.

9. A charging device comprising a casing having an internal chamber provided with an outlet, a plunger movable in said chamber so as to restrict and enlarge the volume thereof, a plug valve extending across the outlet of said chamber, having a passage and being rotatable to place such passage into and out of registry with the outlet, means operated by the plunger during the first part of its movement relatively to the casing for turning said valve so as to place its passage in registry with the outlet, and means for disengaging the operating means from the valve when so placed, whereby the plunger is enabled to continue its movement without actuating the valve.

10. A charging device comprising a casing having a chamber provided with an outlet, a plunger movable in said chamber, a plug valve crossing said outlet and having a transverse passage adapted to be placed by rotation of the valve in and out of registry with said outlet, an actuating arm on the plug valve, a bell crank lever mounted on the casing, means connected with the plunger for oscillating said lever during the movement of the plunger, a latch connected with said lever for movement thereby and arranged to engage and shift an operating element which is connected with the valve operating arm, and means for automatically disconnecting said latch from said element when the valve has been turned to bring its passage into registry with the outlet from the casing.

11. A charging device comprising a carrier, a pump casing mounted upon said carrier and being movable relatively thereto, a plunger movable in said casing and connected to said carrier, means for moving the carrier and therewith the casing and the plunger, the casing having a discharge outlet at its end arranged to discharge in the direction in which the casing and plunger are so moved, and a stop for arresting said casing prior to the conclusion of movement of the carrier, whereby the plunger is enabled to move relatively to the casing for expelling the contents thereof.

12. A charging device comprising telescopically arranged relatively movable members, one of which incloses a chamber for containing the material operated upon and has an outlet, and the other of which is movable to expel the material from such outlet, means for moving said members in the direction in which said outlet is arranged to discharge, and means for arresting one of said members while the other continues its movement, whereby the latter member is caused to expel the contents of said chamber.

13. The combination with a mold having an inlet, a charging device consisting of telescopically arranged members, one of which incloses a batter containing chamber and has an outlet leading from such chamber, said members being movable together and also relatively to one another in the direction of a line from the said outlet to the mold inlet, means for so moving said charging device as to bring such outlet into registry with the inlet to said mold, and means for arresting the member having the outlet while the other member continues to move toward the mold, whereby the internal volume of the chamber is made less and the contents thereof is injected into the mold.

14. In a charging device, the combination with a casing having a chamber and provided with an outlet, a plunger movable in said chamber, a valve rotatably mounted in said casing and controlling said outlet, an arm connected to said valve, an engaging element connected with the arm, a latch adapted to engage said engaging element, a lever mounted on said casing carrying said latch, operating connections from said plunger to said lever for moving the same upon movement of the plunger, and a link also connected to the latch and mounted upon the casing and arranged to shift the latch relatively to the lever in such a direction as to disengage it from said engaging element at a determined point in the travel of the plunger.

15. In a molding and baking machine in combination with a mold, an ejector arranged to remove the contents of the mold, a receiving table adjacent to the position occupied by the ejector after so removing such contents, a transferrer mounted and operated to sweep across the ejector and receiving table, and a depository arranged to receive the articles after being so transferred across said table.

16. In a molding machine, the combination with a mold consisting of separable sections and having a bottom formed as an ejector, means for moving said mold and causing it to stop in a different location, a receiving table beside the stopping location of said mold and at a level above the mold, means for raising said ejector to the level of said table and a transferrer arranged and operated to travel across the ejector toward the receiving table while the ejector is so raised, to transfer the ejected contents of the mold to said table.

17. A delivering mechanism for a machine of the character described, comprising in combinaiton with a mold composed of separable sections and having a bottom formed as an ejector and movable from a normal depressed position to an elevated position, a receiving table located beside the elevated position of said ejector, a transferrer located in such a position relative to said table as to permit the contents of the mold to be elevated by said ejector between the table and the transferrer, and means for causing the transferrer to sweep across the ejector and the receiving table so as to displace the contents of the mold from the ejector upon the table.

18. A delivery mechanism for a cone baking machine, comprising in combination with a mold adapted to form pastry cones and including an ejector movable from a position at the bottom of the mold to a position above the top thereof, means for so moving said ejector with the baked contents of the mold thereon, a receiving table located at one side of the elevated position of the ejector, a transferrer located at the opposite side of such position, a depository arranged at the opposite side of and below the receiving table, a plug mounted on said depository adapted to enter the hollow interior of a cone and receive the same thereon, and means for shifting said transferrer across the ejector and receiving table and over the depository, whereby the baked cone is removed from the ejector and caused to fall upon the depository and over the plug thereon.

19. A receiving device for the product of a pastry cone baking machine, comprising an intermittently rotated depository having upwardly projecting plugs on the several sides thereof, a receiving table beside and above said depository, and a transferrer mounted to travel across the receiving table from a point beyond the edge thereof opposite to that which is next to the depository, to a position beyond the edge nearest the depository.

20. In a molding and baking machine, the combination with a charging device having a valve, a receiving table, a transferrer for moving the finished product of the machine on the table, and a common mechanism for closing the valve of the charging device and shifting the transferring device.

21. In a baking machine, the combination with a mold having an inlet at its top, a cover mounted on said mold and movable across the inlet, said mold being movable intermittently and adapted to stop in a determined location, a pusher mounted adjacent to such stopping location in position where it may engage said cover, and means for so moving said pusher as to place the cover over the mold inlet.

22. In combination with a charging device, a mold having an inlet arranged to travel beneath said device and to stop in position for receiving the batter therefrom, a cover mounted on said mold adapted to be moved across said inlet, means for displacing the cover from said inlet prior to arrival of the mold in charging position, a pusher arranged adjacent to the charging position of the mold adapted to move said cover across the inlet, means for operating the charging device to inject batter into the mold and associated mechanism arranged to operate said pusher for moving the cover across the inlet subsequent to the injection of batter into the mold.

23. In a charging device, a chamber through which batter constantly flows, a pump having a lateral connection with the chamber, and a plunger working in said pump for drawing the required charge into the pump from the chamber and expelling the charge.

24. A charging device comprising in combination, a series of pump barrels, plungers working in the barrels, a chamber in communication with all of said pump barrels, and means for maintaining a constant flow of batter through said chamber, whereby the plungers are enabled to draw the required quantity for a charge into their respective pump barrels, said barrels also having outlets.

25. In an apparatus of the character described, the combination of a supply tank, a charging device consisting of a chamber having communication at both ends with said tank, one or more pump barrels communicating with said chamber, and a plunger in each of said pump barrels, and means for maintaining a continuous circulation of batter through said tank from the chamber and back to the tank.

26. A charging apparatus comprising essentially a pump having an inlet and an outlet and means for drawing in material through said inlet and expelling the material from said outlet, a chamber for fluid material in communication with said inlet, and means for maintaining in a constant circulation of fluid material into, through, and out of said chamber past the pump.

In testimony whereof I have affixed my signature, in presence of two witnesses.

SAMUEL E. WINDER.

Witnesses:
J. J. DUBERSTEIN,
M. BRADLEY.

Copies of this patent may be obtained for five cents each, by addressing the "Commissioner of Patents, Washington, D. C."